United States Patent [19]

Pantzar

[11] Patent Number: 4,632,607
[45] Date of Patent: Dec. 30, 1986

[54] INDEXABLE CUTTING INSERT

[75] Inventor: Glenn G. E. Pantzar, Årsunda, Sweden

[73] Assignee: Santrade Limited, Lucerne, Switzerland

[21] Appl. No.: 711,524

[22] Filed: Mar. 14, 1985

[30] Foreign Application Priority Data

Mar. 28, 1984 [SE] Sweden ................................ 8401713

[51] Int. Cl.⁴ .............................................. B26D 1/00
[52] U.S. Cl. ........................................ 407/113; 407/42
[58] Field of Search ................. 407/114, 115, 113, 34, 407/42

[56] References Cited

U.S. PATENT DOCUMENTS 4,084,917  4/1978  Stumpp .
4,529,339  7/1985  Shimomura et al. ................ 407/114

FOREIGN PATENT DOCUMENTS 101786    8/1977  Japan ..................................... 407/114
1135944  12/1968  United Kingdom ................ 407/113

*Primary Examiner*—Leonidas Vlachos
*Attorney, Agent, or Firm*—Burns, Doane, Swecker & Mathis

[57] ABSTRACT

An indexable cutting insert (10) for a tool (18) adapted to cut internal right-angled corners in a work piece (19). The insert (10) has a square configuration and comprises a top major surface (11), a bottom major surface (12) and connecting side surfaces (13). The lines of junction between the top major surface and the side surfaces define the main cutting edges (14) and the minor cutting edges (15). The main cutting edges (14) transite into the second cutting edges (15) in the corners of the insert. Each second cutting edge (15D) projects from the square basical shape so that it will lift the inactive main cutting edge (14A) from the machined surface under the insert.

7 Claims, 8 Drawing Figures

INDEXABLE CUTTING INSERT

BACKGROUND AND OBJECTS OF THE INVENTION

This invention relates to an indexable cutting insert for chip removing machining of right-angled corners in a work piece. The cutting insert which has a square basical shape has at least four main cutting edges, each transforming into a minor cutting edge at each cutting corner. Each minor cutting edge projects peripherally from the square basical shape so that the passive main cutting edge closest to the bottom work surface will not abut the same at machining.

Indexable cutting inserts inserted into cutting tools for milling of right-angled corners in work pieces usually have a rombic or triangular configuration. These inserts comprise only two or three cutting edges and said configurations are believed to be the only shapes which can be used when machining of right-angled corners with requisite side clearance. Using a conventional right-angled cutting insert having a radial or axial angle for milling or turning of an internal side surface is not possible due to its inner corner skidding on the machined surface. Thus, it has been common to use an insert having an acute angle between the main and the minor cutting edge for machining of an internal right-angled corner or right-angled inserts inserted in the tool body having a negative radial angle and a positive axial angle.

The present invention relates to an indexable cutting insert having at least four main cutting edges whereby the abovementioned drawbacks may be avoided.

THE DRAWINGS

The invention will be more closely described in connection with the appended drawings showing preferred embodiments of the insert, wherein further characterizing features and advantages will be apparent.

DETAILED DESCRIPTION OF PREFERRED EMBODIMENTS OF THE INVENTION

Figure 1:
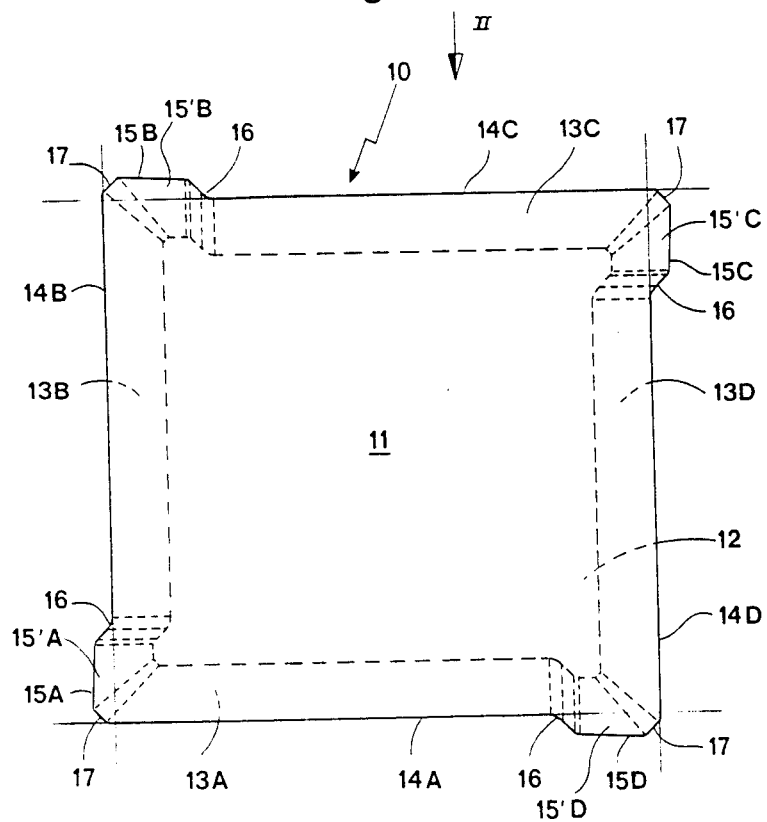
FIG. 1 is a plan view of an indexable cutting insert according to the invention.
Figure 2:
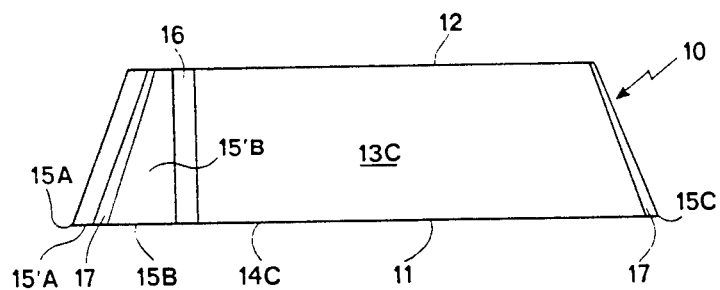
FIG. 2 is a side view of the cutting insert according to the arrow II in FIG. 1.

The indexable cutting insert shown in FIGS. 1 and 2 comprises a top major surface 11, a bottom major surface 12, and four side surfaces 13A, 13B, 13C, 13D extending therebetween. The major surfaces 11, 12 are mainly flat and parallel to each other. The major surfaces are mainly square. The square configuration of the top surface 11 is defined by the intersection of the extension or imaginary lines coinciding with the generally straight main cutting edges 14A, 14B, 14C, 14D, see FIG. 1. Each main cutting edge extends along a major part of the associated extension line. Each side of the square comprises a main cutting edge and a projection 15'A, 15'B, 15'C, 15'D which extends in the plane of the top major surface 11 generally transverse to the direction of said cutting edge. The intersection between the top major surface and the outer extremity of the projection forms a minor cutting edge 15A, 15B, 15C, 15D. The minor cutting edges are arranged outside the square configuration so that for example the minor cutting edge 15D is arranged on the projection 15'D which protrudes in a direction which is generally parallel to the direction of the associated main cutting edge 14D. The minor cutting edge is the part of the cutting insert which generates the work surface. Said work surface is generated at milling in a plane which is perpendicular to the center line of the milling cutter. At turning the work surface is the radially inner surface of the rotating work piece.

The bottom major surface 12 has a generally square configuration but it is reduced relative to the top major surface so as to form clearance rakes and a positive cutting insert geometry.

The minor cutting edge 15D is straight in FIG. 1 and angled relative to the main cutting edge 14A. The minor cutting edge may alternatively be arched or sinusoidal. The minor cutting edge 15D transforms into the main cutting edge via a rounded portion 16 and into the associated main cutting edge 14D via a bevel 17. The bevel 17 may be replaced by a rounded nose. The major surfaces 11, 12 may alternatively be equally large and perpendicularly connected to each other by the edge surfaces. It is frictionally advantageous if the extension of the second cutting edges between the major surfaces are limited, but the extension should be at least 10% of the distance between the major surfaces. The extension of the minor cutting edge 15D for example, i.e. the distance between the main cutting edge 14D and the portion 16, should be between 5 to 50% of the square side, preferably in the lower part of the interval.

Figure 3:
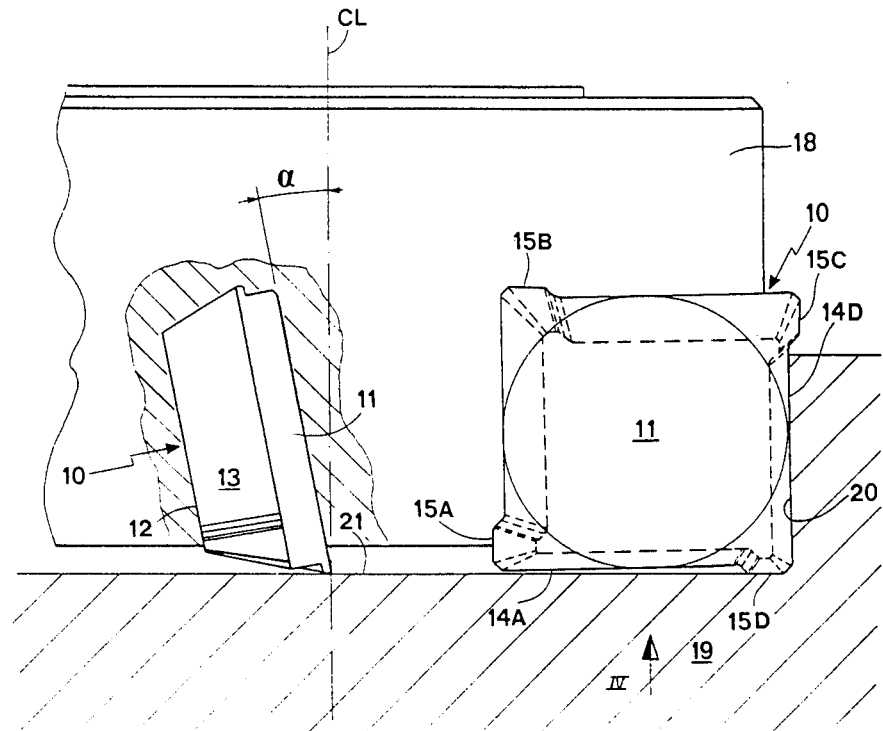
FIG. 3 is a side view of a milling cutter in section.

In FIG. 3 are shown two indexable cutting inserts 10 inserted in a partially and principally sketched milling cutter 18, wherein the right-handed insert machines a work piece 19. Each insert receiving site of the tool body is arranged to receive two inactive minor cutting edges 15A, 15B. The projected main cutting edge 14D is parallel in this view with the center line CL of the milling cutter and the active minor cutting edge 15D is perpendicular to said center line. Thus, the arched tangential work surface 20 will form an angle of 90 degrees relative to the bottom surface 21. The main cutting edge may possibly be inclined so that the angle between the work surfaces 20, 21 becomes lesser than 90 degrees and thereby attaining a corner functionally of 90 degrees. The active minor cutting edge 15D will lift the inactive main cutting edge 14A from the bottom work surface 21 and therefore stop the edge and the surface from being worn or scratched. The cutting depth of the insert in the direction opposed to the arrow IV in FIG. 3 is limited by the inactive minor cutting edge 15C. It is possible to index the insert if the associated cutting edges 14D, 15D have been worn so that a new pair of cutting edges, 14A and 15A for example, come into the cutting position.

The other insert which is inserted into the tool body behind the plane of the section in FIG. 3 shows the axial angle α relative to the center line CL. The insert is positioned with a positiv axial angle α but it may also be negative.

Figure 4:
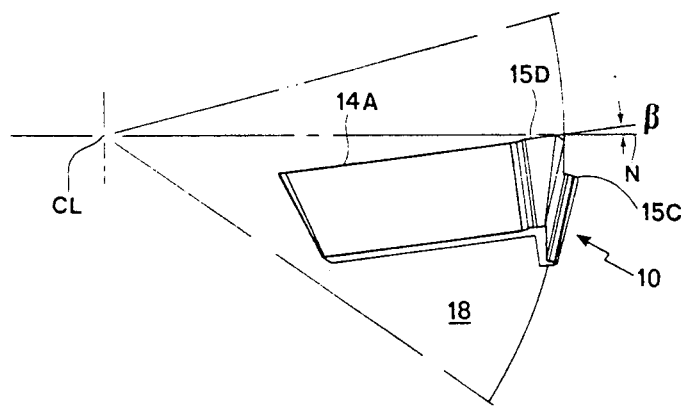
FIG. 4 is a bottom view of the cutting insert inserted in the milling cutter according to the arrow IV in FIG. 3.

FIG. 4 shows an insert 10 in a partially shown tool body 18 in a bottom view according to the arrow IV in FIG. 3. The insert is inclined relative to the normal N of the center line Cl whereby the insert obtains a positive radial angle $\beta$. This angle $\beta$ may also be chosen negative.

Figure 5:
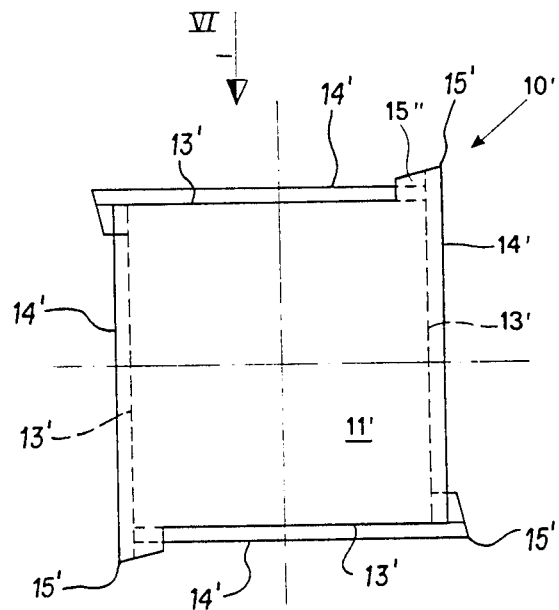
FIG. 5 is a plan view of another indexable cutting insert according to the invention.
Figure 6:
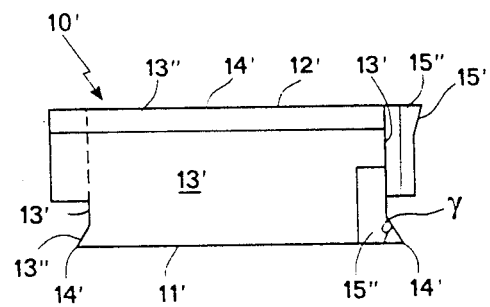
FIG. 6 is a side view of the cutting insert according to the arrow VI in FIG. 5.

An alternative embodiment of an insert according to the invention is shown in FIGS. 5 and 6. This insert 10' differs from the above-discussed insert 10 in being an on-edge insert. The insert 10' has four pairs of main and minor cutting edges 14' and 15', respectively, i.e. two pairs on each side. Alternatively four pairs of cutting edges may be placed on one side. The insert 10 comprises two flat major surfaces 11', 12', each having a generally square configuration defined by mainly straight main cutting edges 14' extending along a major part of each square side. Each said side comprises a main cutting edge and a projection 15" extending in the plane of the associated major surface transverse to the direction of said cutting edge.

The major surfaces 11', 12' are of generally identical configuration and are mainly parallel and have four side surfaces 13' extending therebetween so as to form chip surfaces.

Each projection 15" extends at least partially between the major surfaces. A part of the intersection between each projection 15" and the associated side surface 13' forms a minor cutting edge 15'.

Figure 7:
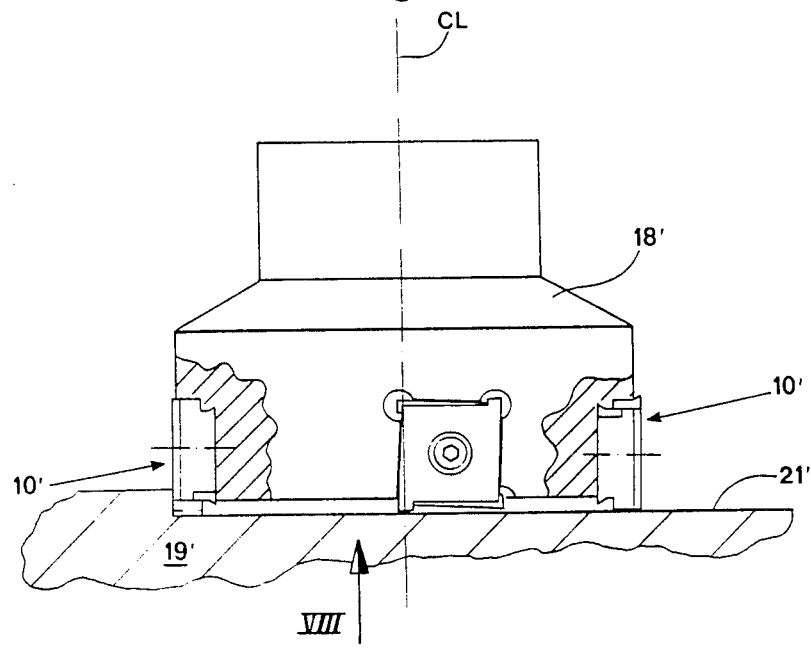
FIG. 7 is a side view of a milling cutter partly in section, having inserts according to FIGS. 5 and 6.
Figure 8:
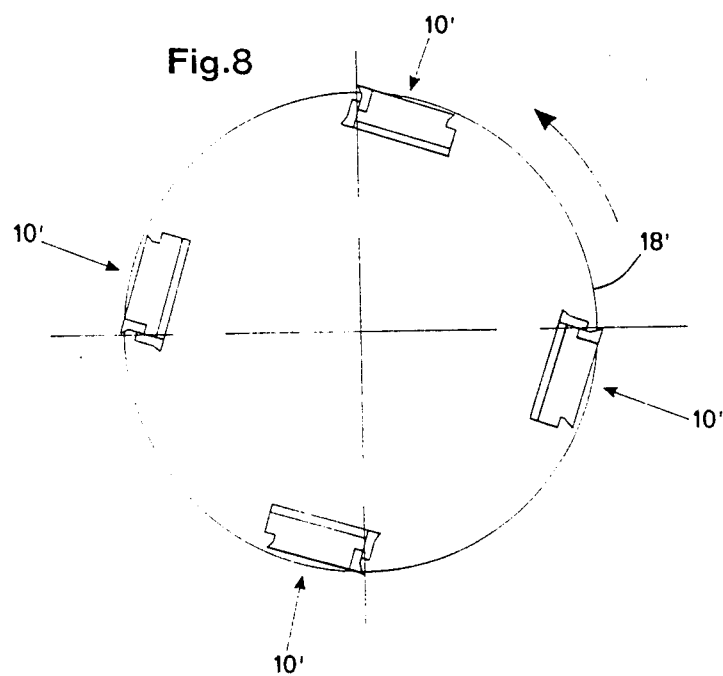
FIG. 8 is a bottom view of the milling cutter according to the arrow VIII in FIG. 7.

The minor cutting edges 15' extend in an inclined manner along the side surfaces 13. The two mainly parallel major surfaces 11', 12' are connected by trapezoidal side surfaces 13'. The side surface 13' may also be arched or V-shaped wherein the cylindric surface or the shank surface 13" of the side surface 13' serve as a chip surface. The minor cutting edge 15' is inclined an angle $\alpha$ relative to th major surface 11'. The angle $\alpha$ is chosen within the interval 0 to 90 degrees, preferably 45 to 90 degrees. Thus, the cutting insert has a negative basic shape at 90 degrees. The insert 10' is tangentially mounted in the tool body 18' shown in FIG. 7. The insert 10' is mounted to the tool body 18' by means of a screw traversing the central aperture of the insert. The insert has eight pairs of cutting edges each of which may be indexed for service. The minor cutting edge 15' will lift the inactive main cutting edge from the bottom surface 21' of the work piece 19'. FIG. 8 shows the tool body 18' according to the arrow VIII in FIG. 7 and the rotational direction thereof.

The present invention relates to an indexable cutting insert of a square configuration which comprises at least four pairs of cutting edges adapted to machine right-angled internal corners in a work piece. The inactive main cutting edge closest to the machined surface is separated from the same during the operation. Cutting inserts according to the invention result in a favourable economy of machining as an extra pair of cutting edges is achieved relative to conventional cutting inserts for machining of right-angled corners in work pieces.

I claim:

1. An indexable cutting insert comprising upper and lower faces interconnected by four side surfaces, the intersection between said side surfaces and said upper face forming four main cutting edges each coinciding with an imaginary line; said imaginary lines intersecting to form a square, intersecting pairs of said imaginary lines defining four cutting corners; each said side surface including a projection disposed at one of said cutting corners whereby there are four said projections each disposed at one of said corners such that each projection is associated with two of said main cutting edges forming the respective corner; a first of such pair of main cutting edges being formed on said side surface carrying such projection, and a second of such pair of main cutting edges formed on the other side surface which forms such corner; each projection projecting transversely relative to its associated first main cutting edge and parallel to its associated second main cutting edge; each projection forming a minor cutting edge disposed outside of said square; each minor cutting edge being joined to and extending at an angle relative to its associated second main cutting edge; each minor cutting edge defining an active cutting edge when its associated first and second main cutting edges are inactive and active, respectively, so that said minor cutting edge maintains such inactive main cutting edge spaced from a workpiece being cut.

2. An indexable cutting insert according to claim 1, wherein said minor cutting edge is coplanar with said four main cutting edges.

3. An indexable cutting insert according to claim 2, wherein said lower face includes an outer periphery spaced inwardly relative to an outer periphery of said upper face, said upper face defining a chip surface for said main and minor cutting edges.

4. An indexable cutting insert according to claim 1, wherein each minor cutting edge is disposed at an acute angle relative to its associated first cutting edge.

5. An indexable cutting insert according to claim 1, wherein the length of each minor cutting edge is at least ten percent of each side of said square.

6. An indexable cutting insert comprising upper and lower faces interconnected by four side surfaces, the intersection between said side surfaces and said upper and lower faces forming four edges along said upper face and four edges along said lower face, each of said edges coinciding with an imaginary line, said four imaginary lines along said upper face intersecting to form an upper square and said four imaginary lines along said lower face intersecting to form a lower square of the same size as said upper square, two opposed ones of said edges of said upper face defining main cutting edges, and two opposed ones of said edges of said lower face defining main cutting edges which are offset by ninety degrees relative to said main cutting edges of said upper face, each of said main cutting edges of said upper face intersecting a non-cutting one of said edges of said upper face to form therewith a corner, each of said main cutting edges of said lower face intersecting a non-cutting one of said edges of said lower face to form therewith a corner, each said side surfaces including a projection disposed at one of said corners whereby there are four said projections each disposed at one of said corners such that two of said projections are associated with two of said corners of said upper edge and the other two of said projections being associated with two corners of said lower edge and being offset by ninety degrees relative to said two corners of said upper edge, each projection being formed on the side surface which carries said non-cutting edge associated with such projection; each projection projecting transversely relative to its associated non-cutting edge and parallel to its associated main cutting edge; each projection forming a minor cutting edge disposed outside of said square of its respective face; each minor cutting edge being joined to and extending at an angle relative to its associated main cutting edge; each minor cutting edge defining an active cutting edge when its associated main cutting edge is active, so that said minor cutting edge maintains its associated non-cutting edge spaced from a workpiece being cut.

7. An indexable cutting insert according to claim 6, wherein each said minor cutting edge is disposed outside of a plane defined by said square of its respective said face.

* * * * *